(12) United States Patent
Yoshida et al.

(10) Patent No.: US 8,116,263 B2
(45) Date of Patent: *Feb. 14, 2012

(54) RADIO COMMUNICATION APPARATUS

(75) Inventors: Akihiko Yoshida, Yokohama (JP); Shiro Mazawa, Yokohama (JP); Kiyoshi Kawamoto, Yokohama (JP); Yosuke Takahashi, Yokohama (JP); Keiji Usuba, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1085 days.

This patent is subject to a terminal disclaimer.

(21) Appl. No.: 11/870,778

(22) Filed: Oct. 11, 2007

(65) Prior Publication Data

US 2008/0175218 A1     Jul. 24, 2008

Related U.S. Application Data

(63) Continuation of application No. 10/980,241, filed on Nov. 4, 2004, now Pat. No. 7,724,724.

(30) Foreign Application Priority Data

Nov. 7, 2003 (JP) .................................. 2003-377729

(51) Int. Cl.
 H04W 4/00    (2009.01)
 H04J 3/07    (2006.01)
(52) U.S. Cl. ........................ 370/328; 370/505
(58) Field of Classification Search .................. None
See application file for complete search history.

(56) References Cited

U.S. PATENT DOCUMENTS

| | | | |
|---|---|---|---|
| 5,887,252 A | 3/1999 | Noneman | |
| 7,545,826 B2 | 6/2009 | Sugaya | |
| 7,724,724 B2 * | 5/2010 | Yoshida et al. | 370/349 |
| 2002/0184642 A1 * | 12/2002 | Lude et al. | 725/105 |
| 2004/0120285 A1 | 6/2004 | Paila et al. | |
| 2005/0020299 A1 * | 1/2005 | Malone et al. | 455/552.1 |
| 2005/0058137 A1 * | 3/2005 | Carlson et al. | 370/395.4 |
| 2005/0169203 A1 * | 8/2005 | Sinnarajah et al. | 370/312 |
| 2005/0259622 A1 * | 11/2005 | Czaja et al. | 370/335 |
| 2006/0259944 A1 * | 11/2006 | Tash | 725/135 |

FOREIGN PATENT DOCUMENTS

| | | |
|---|---|---|
| CN | 1430424 | 7/2003 |
| EP | 0 828 355 | 3/1998 |
| JP | 2002-247131 | 8/2002 |
| WO | WO 03/075515 | 9/2003 |

OTHER PUBLICATIONS

3GPP2 (3$^{rd}$ generation partnership project 2), C.S0054 Version 0.9, Jul. 14, 2003.

* cited by examiner

*Primary Examiner* — Anh-Vu Ly
(74) *Attorney, Agent, or Firm* — Antonelli, Terry, Stout & Kraus, LLP.

(57) ABSTRACT

An AN (Access Network) controlled by a communication control apparatus and communicating with a AT Access Terminal), wherein the AN receives control information including information for allocating communication information from the communication control apparatus, and the AN transmits transmission cycle information for transmitting the communication information in a predetermined transmission cycle to the AT and allocates the communication information in the predetermined transmission cycle based on the control information received from the communication control apparatus to send the communication information to the AT.

6 Claims, 12 Drawing Sheets

FIG.2

200
BLOCK A

| $a_1$ | $a_2$ | $a_3$ |
|---|---|---|
| $a_4$ | $a_5$ | $a_6$ |
| $a_7$ | $a_8$ | $a_9$ |

201
BLOCK B

| $b_1$ | $b_2$ | $b_3$ |
|---|---|---|
| $b_4$ | $b_5$ | $b_6$ |
| $b_7$ | $b_8$ | $b_9$ |

202
BLOCK N

| $n_1$ | $n_2$ | $n_3$ |
|---|---|---|
| $n_4$ | $n_5$ | $n_6$ |
| $n_7$ | $n_8$ | $n_9$ |

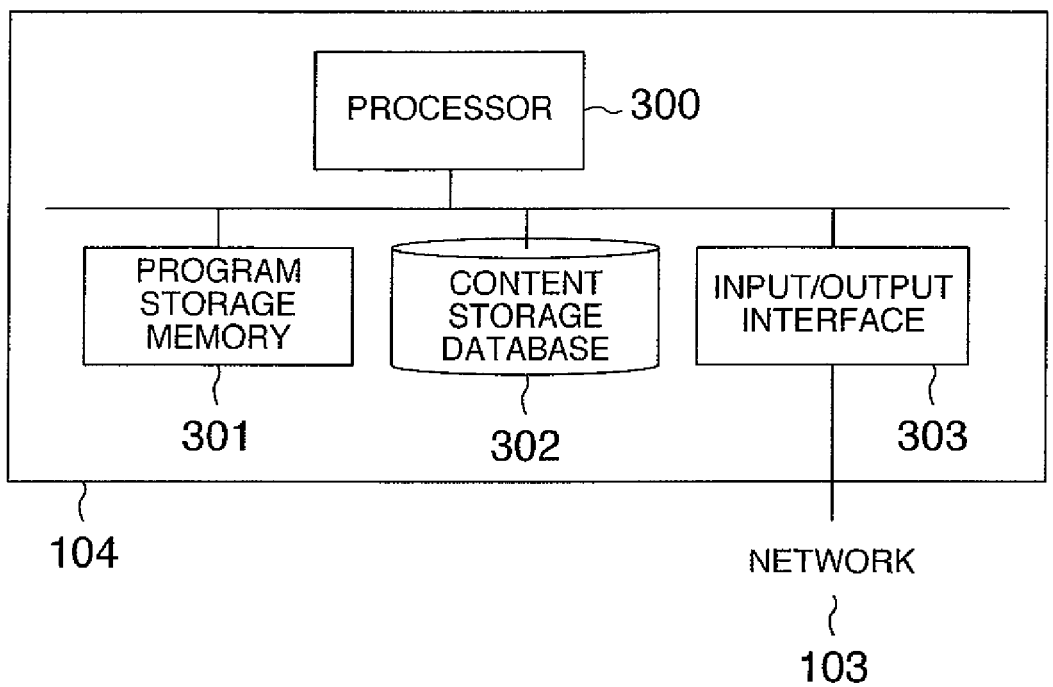

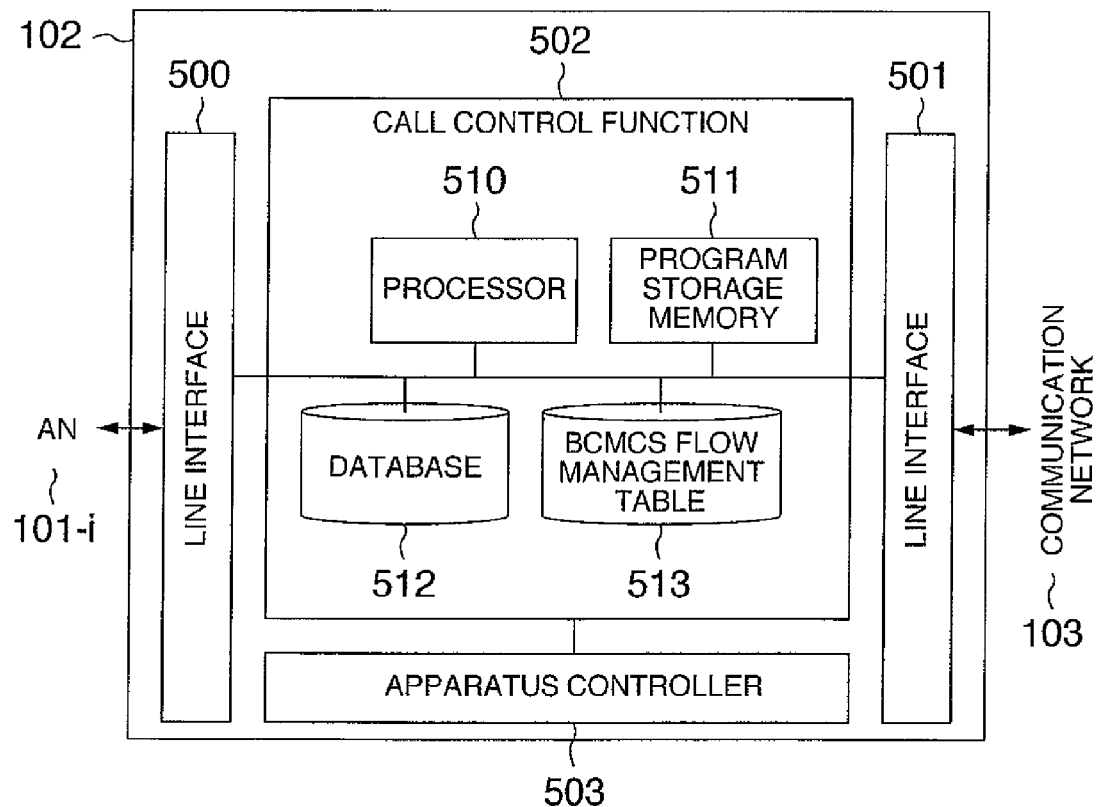

| BCMCS FLOW ID (701) | TRANSMISSION SLOT NUMBER (slots) (702) | TRANSMISSION TIMING (HEAD SLOT (slot)) (703) | TRANSMISSION CYCLE (slots) (704) |
|---|---|---|---|
| 1 | 12 | 0 | 48 |
| 2 | 10 | 12 | 48 |
| 3 | 8 | 22 | 48 |
| ⋮ | ⋮ | ⋮ | ⋮ |

| BCMCS FLOW ID (901) | PHYSICAL DATA RATE (kbps) (902) | TRANSMISSION SLOT NUMBER (slots) (903) | TRANSMISSION TIMING (HEAD SLOT (slot)) (904) | TRANSMISSION CYCLE (slots) (905) |
|---|---|---|---|---|
| 1 | 614.4 | 12 | 0 | 48 |
| 2 | 307.2 | 10 | 12 | 48 |
| 3 | 76.8 | 8 | 22 | 48 |
| ⋮ | ⋮ | ⋮ | ⋮ | ⋮ |

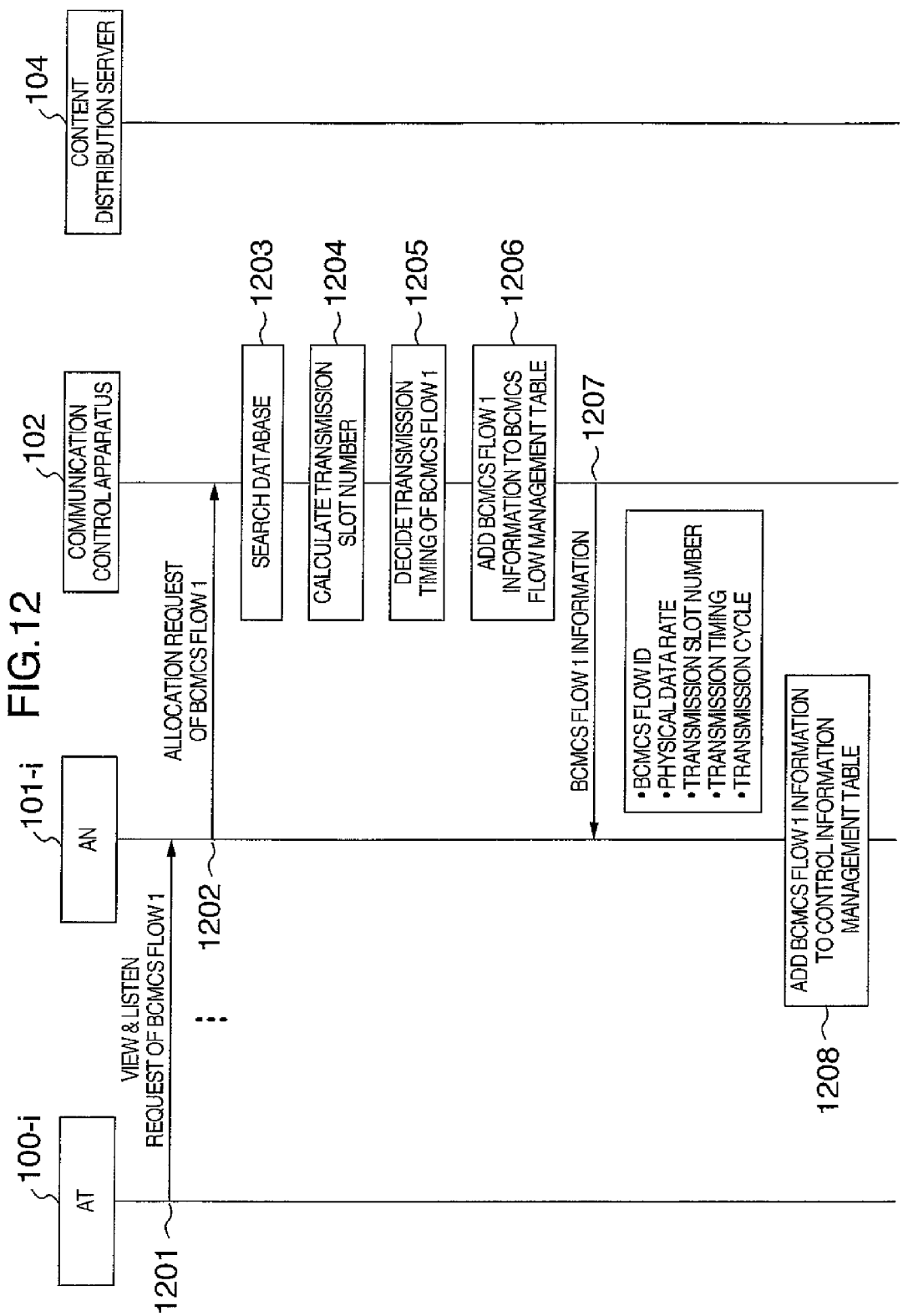

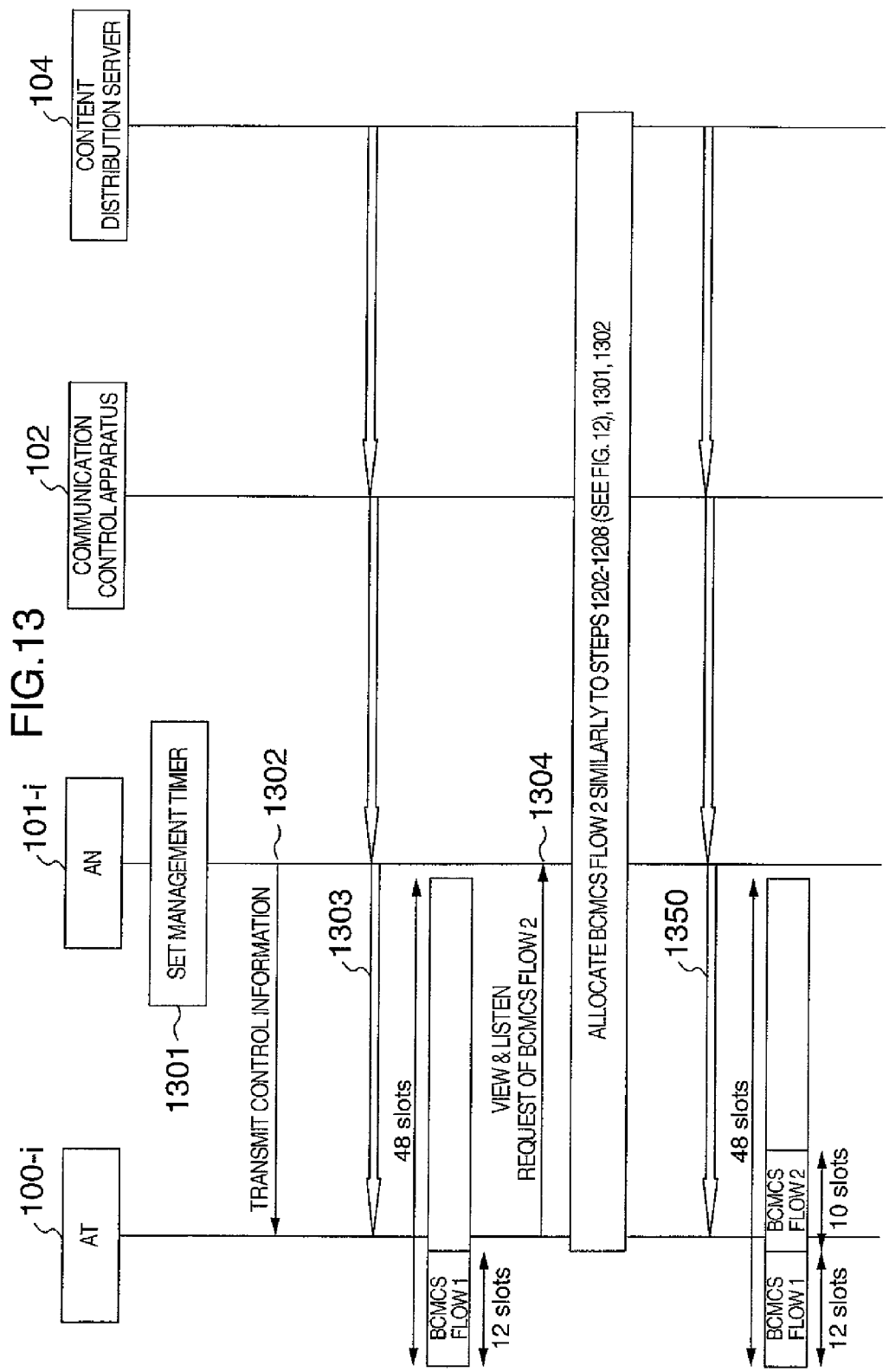

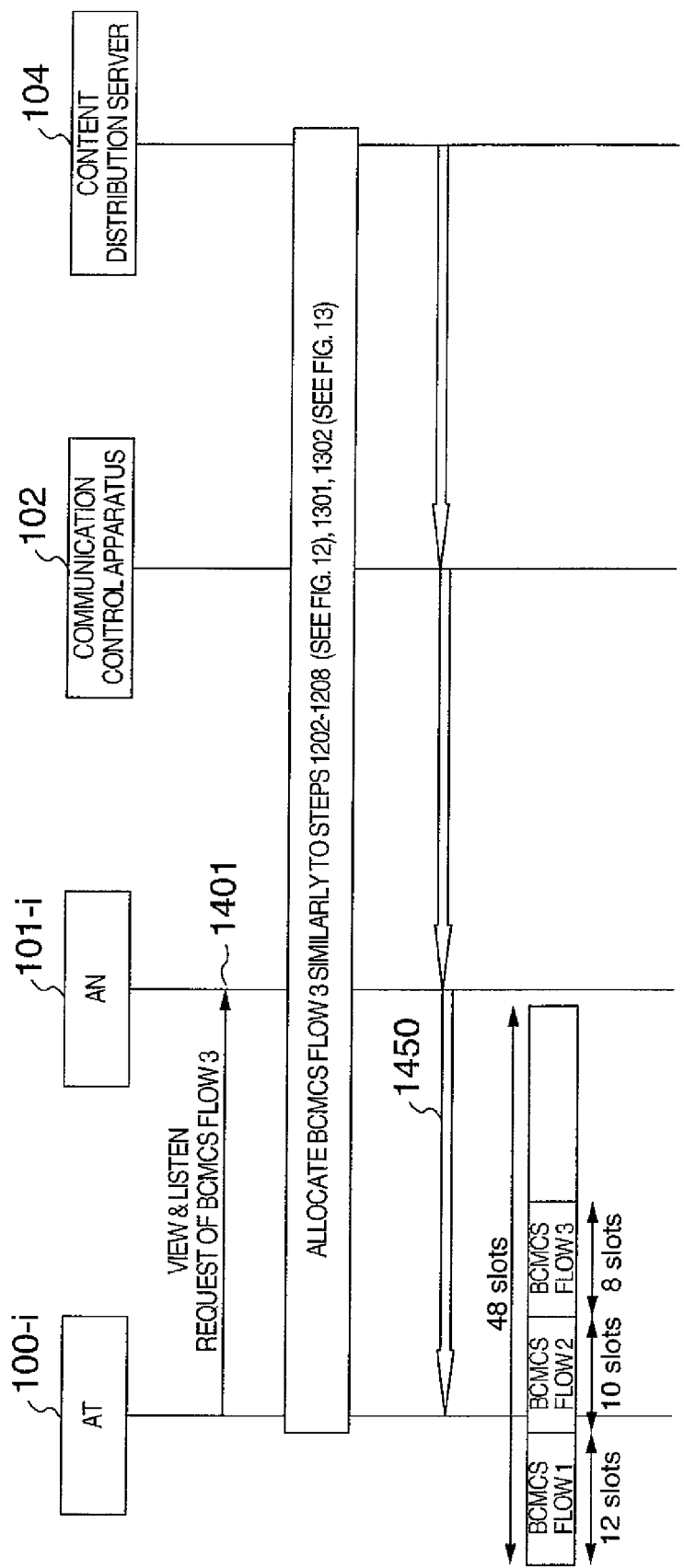

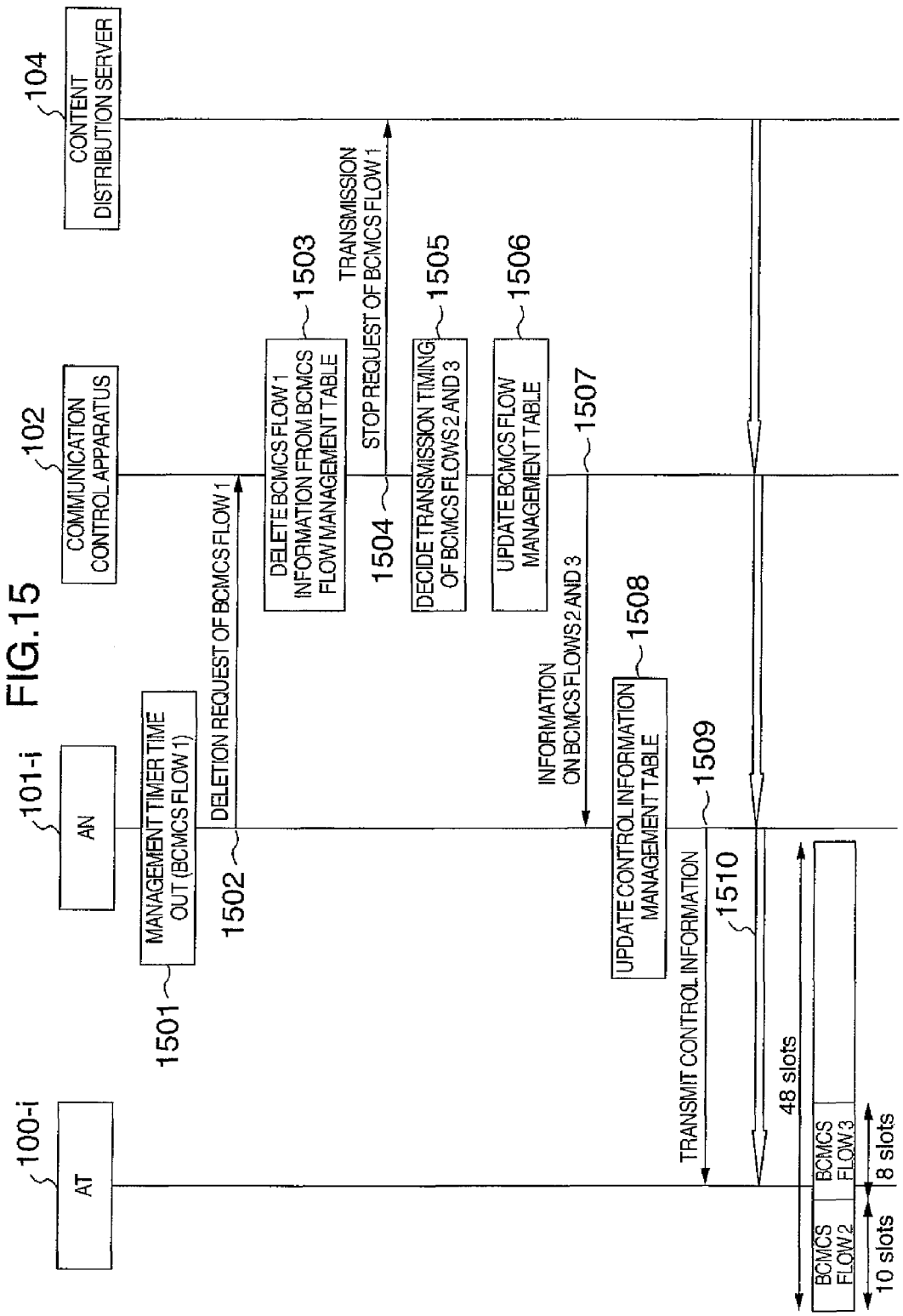

RADIO COMMUNICATION APPARATUS

CROSS REFERENCE TO RELATED APPLICATION

This is a continuation of U.S. application Ser. No. 10/980,241, filed Nov. 4, 2004 now U.S. Pat. No. 7,724,724. This application relates to and claims priority from Japanese Patent Application No. 2003-377729, filed on Nov. 7, 2003. The entirety of the contents and subject matter of all of the above is incorporated herein by reference.

BACKGROUND OF THE INVENTION

The present invention relates to a technique for controlling transmission of communication information such as voice or data to be transmitted to an access terminal (which will be referred to as merely AT, hereinafter) in a radio communication apparatus.

In a communication field, in these years, as broadband communication spreads, routers and so on are technically advanced, and the need for end users to want to receive a large capacity of streaming video, etc. at ATs is increased; much attention has been focused on a technique for broadcasting not only a large capacity of data or voice but also with use of communication resources less than unicast communication, that is, a multicast technique. The multicast is a technique for simultaneously transmitting a single packet or a data stream to a plurality of parties. A router provided between a server and a client acts to copy the packet or the data stream by a necessary number and to transmit the copies to a multiplicity of ATs. The unicast, on the other hand, is a technique for transmitting a plurality of packets or data streams to a plurality of parties in a 1:1 relation. When the same voice or data is transmitted to a plurality of ATs, routers, servers, etc.; the employment of the multicast enables a traffic flowing through a network to be suppressed or the load of an application server to be reduced, when compared with the unicast which requires transmission of a plurality of packets or data streams.

Even in radio communication, for the purpose of realizing efficient radio bandwidth use, a communication technique for receiving a single piece of voice or data at a plurality of ATs has been studied. Conventionally, 1:1 unicast communication wherein a physical channel is allocated to each AT to establish a 1:1 radio communication connection has been employed. By allocating specific one of the physical channels as a multicast channel, the same voice or data is transmitted to a plurality of ATs. That is, efficient radio bandwidth use can be realized by receiving a single data stream at the plurality of ATs. The radio wave reception states at ATs vary depending on the radio wave propagation environment between the AT and an access network (which will be referred to merely as AN, hereinafter).

In the unicast communication, 1:1 communication is carried out between the AT and the AN or sector. Thus, such adjustment can be possible as to increase the data transmission rate of voice or data to be transmitted when the radio wave reception state of each AT is good or to decrease the transmission rate when the wave reception state is bad. In the multicast communication, on the other hand, each AT is required to receive voice or data transmitted at a specific data transmission rate from a prescribed multicast channel. Thus, there exists an AT which cannot secure a bandwidth necessary for receiving data at the transmission rate and cannot receive the multicast data due to bad radio wave reception environment. Whether or not the AT can decode the received voice or data depends on a ratio in magnitude between actually received voice or data and noise signals. In order for an increased number of ATs to be capable of receiving voice or data multicast with a constant data transmission rate, it is required to increase the ratio in magnitude of the actual voice or data signal to the noise signal.

When code division multiple access (CDMA) is used as the radio communication technique, communication is carried out by selecting one of ANs (or sectors) which has the best radio wave state in the conventional unicast communication technique. For this reason, when radio waves transmitted from adjacent ANs or sectors not selected have the same frequency, the radio waves become all interference noise. As a method for increasing the ratio of actual voice or data to noise, there is described in 3GPP2 (3rd generation partnership project 2), C. S0054 version 0.9 a technique wherein the same voice or data signals are transmitted at the same timing from a plurality of adjacent ANs, and these voice and data signals are combined at an AT. Since the same voice or data signals are transmitted at the same timing from a plurality of adjacent ANs or sectors and the signals transmitted from the ANs or sectors are combined at an AT, the ratio of actual voice or data to noise can be made larger than that in the communication technique by selecting one of ANs (or sector) having a good radio wave environment. As a result, an increased number of ATs can receive the multicast data. The timing of transmitting voice or data from the ANs (or sectors) is included in control information and is informed from the ANs to the ATs at intervals of a constant period.

SUMMARY OF THE INVENTION

In a radio communication system, radio wave reception states of ATs vary according to their radio wave propagation environments. Thus the radio communication system requires a technique by which an increased number of ATs can receive a voice or data signal multicast from ANs (or sectors) at an arbitrary data transmission rate. In this specification, a cluster of voice or data to be transmitted will be referred to as BCMCS (Broadcast/Multicast Service) flow, hereinafter. In a 1× EV-DO (1× Evolution Data Only) system for providing data communication based on a CDMA radio communication technique, a block called ECB (Error Control Block) having an error correction code applied to a data part is generated, the data part is divided into each BCMCS flows to be transmitted, and then transmitted. When a multicast service is carried out in the 1×EV-DO system, for the purpose of enabling reception of the BCMCS flow at an increased number of ATs; voice or data signals from a plurality of ANs or sectors, which would be interference nose in the prior art, are transmitted at the same timing as the same voice or data signal. To this end, the system is provided with a function of combining and reconstructing the transmitted BCMCS flow. As a result, the radio wave propagation environments of the ATs can be improved. When a BCMCS flow becomes missed in a radio space, for the purpose of avoiding a shift in the timing of transmitting the BCMCS flow between ANs or sectors, the transmission/reception timing of the BCMCS flow is prescribed by an algorithm called 'system time modulo transmission cycle'. Since the transmission cycle of the entire BCMCS flows is prescribed by a sum value of transmission times of the respective BCMCS flows, the transmission cycle is dynamically changed by addition or deletion of a BCMCS flow. When the transmission cycle varies, the transmission/reception timing is changed. This results in that the AT cannot reconstruct the BCMCS flow being transmitted. For this reason, data or voice signal transmitted from the AN or sector is required to be discarded in units of ECB. That is, in the prior art, since the transmission cycle is changed by addition or deletion of a BCMCS flow, all the BCMCS flow being transmitted is affected thereby before and after the addition or deletion of the BCMCS flow. In the multicast communication, since the same BCMCS flow is transmitted in synchronism between a plurality of ANs or sectors, the influence of the change in the transmission timing is exerted upon the other ANs. For this reason, each time addition or deletion of a BCMCS flow is carried out at an AN (or sector), contents during listening thereto or viewing thereof is interrupted for a constant time.

An object of the present invention is to provide an apparatus for realizing such communication control that, even in the presence of addition or deletion of a BCMCS flow, a BCMCS flow transmitted from an AN can be reliably reconstructed at ATs.

In accordance with the present invention, the above object is attained by an apparatus which includes a plurality of ATs and ANs for transmitting and receiving data or voice to and from the ATs, and also includes a means for finding a time at which the aforementioned communication information is transmitted to the ATs and a parameter for defining a cycle of transmitting the aforementioned data or voice signal, and a means for informing the ATs of the transmission time and the parameter at a constant period on the basis of control information.

Other objects, features and advantages of the invention will become apparent from the following description of the embodiments of the invention taken in conjunction with the accompanying drawings.

BRIEF DESCRIPTION OF THE DRAWINGS

FIG. 2 shows blocks having an error correction code applied to each voice or data to be transmitted to an AT 100-*i*;

FIG. 3 is a block diagram of a structure of a content distribution server 104;

FIG. 4 shows a structure of a content storage database 302;

FIG. 5 is a block diagram showing an arrangement of a communication control apparatus 102;

FIG. 6 shows a structure of a database 512 provided in the communication control apparatus 102;

FIG. 7 shows a structure of a BCMCS flow management table 513 provided in the communication control apparatus 102;

FIG. 9 shows a structure of a control information management table 812 provided in the AN 101-*i*;

FIG. 12 is a sequence diagram showing the operation of the radio communication system 1 to which the present invention is applied;

FIG. 13 is a sequence diagram showing the operation of the radio communication system 1 to which the present invention is applied;

FIG. 14 is a sequence diagram showing the operation of the radio communication system 1 to which the present invention is applied;

FIG. 15 is a sequence diagram showing the operation of the radio communication system 1 to which the present invention is applied.

DESCRIPTION OF THE EMBODIMENTS

Embodiments of the present invention will be detailed with reference to the accompanying drawings.

1. Embodiment 1

Figure 1:
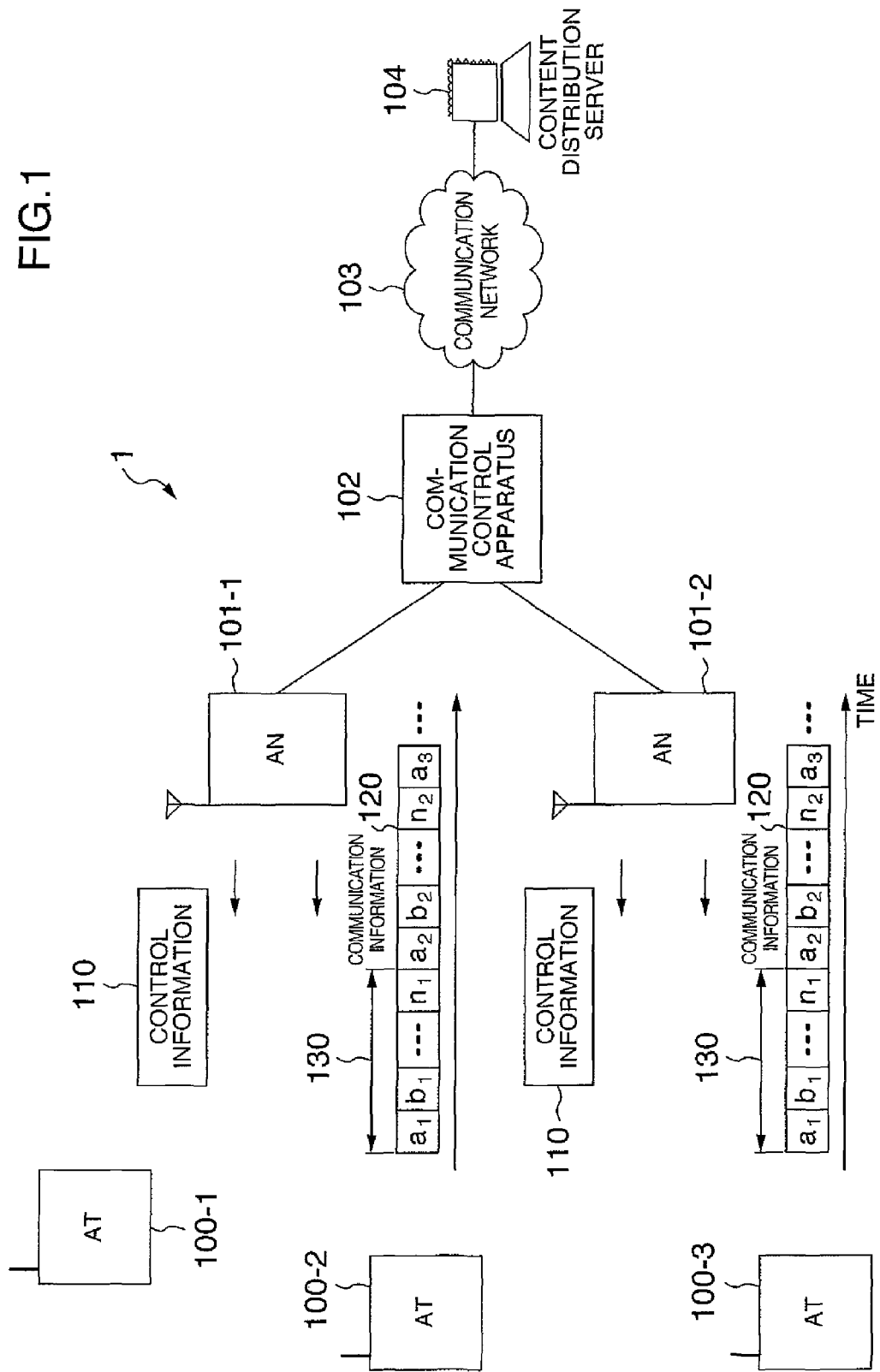
FIG. 1 shows a configuration of a radio communication system 1 to which the present invention is applied.

FIG. 1 shows a configuration of a radio communication system 1 to which the present invention is applied. The radio communication system 1 includes a plurality of ATs 100-*i* (i=1 to 3) to be connected with the ATs, a plurality of ANs 101-*i* (i=1 and 2), and a communication control apparatus 102s connected to the plurality of ANs and a communication network 103. The communication network 103 is connected with a content distribution server 104.

The content distribution server 104 is a server for distributing contents (communication information) such as voice or data to the ATs on a packet basis. A cluster of voice, data or the like distributed from the content distribution server 104 will be referred to as BCMCS flow, hereinafter.

The communication control apparatus 102 controls a physical data rate and an application data rate for each BCMCS flow. The apparatus finds a transmission time and transmission timing on the basis of the above information, and transmits the found information to the ANs 101-*i* together with information about transmission cycle or the like.

The AN 101-*i* inserts the information about the transmission cycle, transmission time, transmission timing, etc. transmitted from the communication control apparatus 102 in control information 110, and informs the AT 100-*i* of the information. The AN 101-*i*, on the basis of the control information about the transmission cycle, transmission time, transmission timing, etc.; also controls transmission of a BCMCS flow 120 to the AT 100-*i*. As shown in FIG. 2, the AN 101-*i* further generates blocks 200, 201, and 202 having an error correction code applied thereto for each voice or data to be transmitted to the AT 100-I; divides the blocks into BCMCS flow units each to be transmitted in one transmission cycle 130; and then transmits each flow unit. The BCMCS flow is broadcast and transmitted to the AT 100-*i*.

Each AT 100-*i* combines desired one of BCMCS flows ($a_i, b_i, \ldots,$ and $n_i$) (e.g., i=1 to 9) transmitted from the plurality of ANs 101-1 and 101-2, and reconstructs the desired BCMCS flow in units of block. For example, the AT 100-1 receives a block A (see FIG. 2) and reconstructs it. Similarly, the ATs 100-2 and 100-3 receive blocks B and C and reconstructs them respectively.

FIG. 3 is a block diagram of a configuration of a content distribution server 104. The content distribution server 104 includes a processor 300, a memory 301 for storing a program and so on to be executed by the processor 300, a content storage database 302 for storing contents to be distributed to the ATs 100-*i*, and an input/output interface 303 connected to the communication network 103.

FIG. 4 shows a structure of the content storage database 302. Stored in the content storage database 302 are BCMCS flow IDs for identification of contents and contents (such as movie, music, etc.) associated therewith. The processor 300 reads out the BCMCS flow ID and the corresponding contents from the content storage database 302, converts them to packets, and transmits the packets from the input/output interface 303 to the communication network 103.

FIG. 5 is a block diagram of an arrangement of the communication control apparatus 102. The communication control apparatus 102 has a line interface 500 to be connected to the ANs 101-*i*, a line interface 501 to be connected to the communication network 103, a call control function 502 connected to the line interfaces 500 and 501, and an apparatus controller 503 connected to the call control function 502.

In the illustrated example, the line interfaces 501 and 502 transmits and receives a packet to and from the AN 101-$i$ and the communication network 103, respectively. The call control function 502 in turn has a processor 510, a memory 511 for storing a program or the like to be executed by the processor 510, a database 512 for storing the transmission rate, etc. of a BCMCS flow, and a BCMCS flow management table 513 for storing the transmission timing, etc. of the BCMCS flow. In the present embodiment, the processor 510 finds a BCMCS flow ID included in the packet received from the content distribution server 104 and finds the transmission timing, etc. of the BCMCS flow from the database 512; controls to transmit the found information to the AN 101-$i$; and also records it in the BCMCS flow management table 513. The apparatus controller 503 generally controls the entire communication control apparatus 102. A plurality of such line interfaces 500 may be provided according to the number of ANs to be connected.

FIG. 6 shows a structure of the database 512 provided in the communication control apparatus 102. Stored in the database 512 are a BCMCS flow ID 601, a physical data rate 602 in a radio space when the AN 101-$i$ transmits a BCMCS flow to the AT 100-$i$, and an application data rate 603 required by an application of the AT 100-$i$, these data being associated with each other.

FIG. 7 shows a structure of the BCMCS flow management table 513 provided in the communication control apparatus 102.

Stored in the BCMCS flow management table 513 are a BCMCS flow ID 701 for identification of the BCMCS flow, a transmission slot number 702, a transmission timing 703 (allocated head slot), and transmission cycle 704, these data being associated with each other.

In the illustrated example, the transmission slot number 702 indicates the length of the BCMCS flow and is prescribed by the number of slots. The transmission timing 703 indicates timing of transmitting the BCMCS flow, and is prescribed by the position of the head slot on which the first unit of the BCMCS flow is to be allocated. The transmission cycle 704 indicates a cycle (fixed value) at intervals of which the divided BCMCS flow units are transmitted, and is prescribed by the number of slots corresponding to the interval. The transmission cycle 704, which is determined by a relation between the transmission rate of the BCMCS flow and delay, is previously set in the BCMCS flow management table 513.

Figure 8:
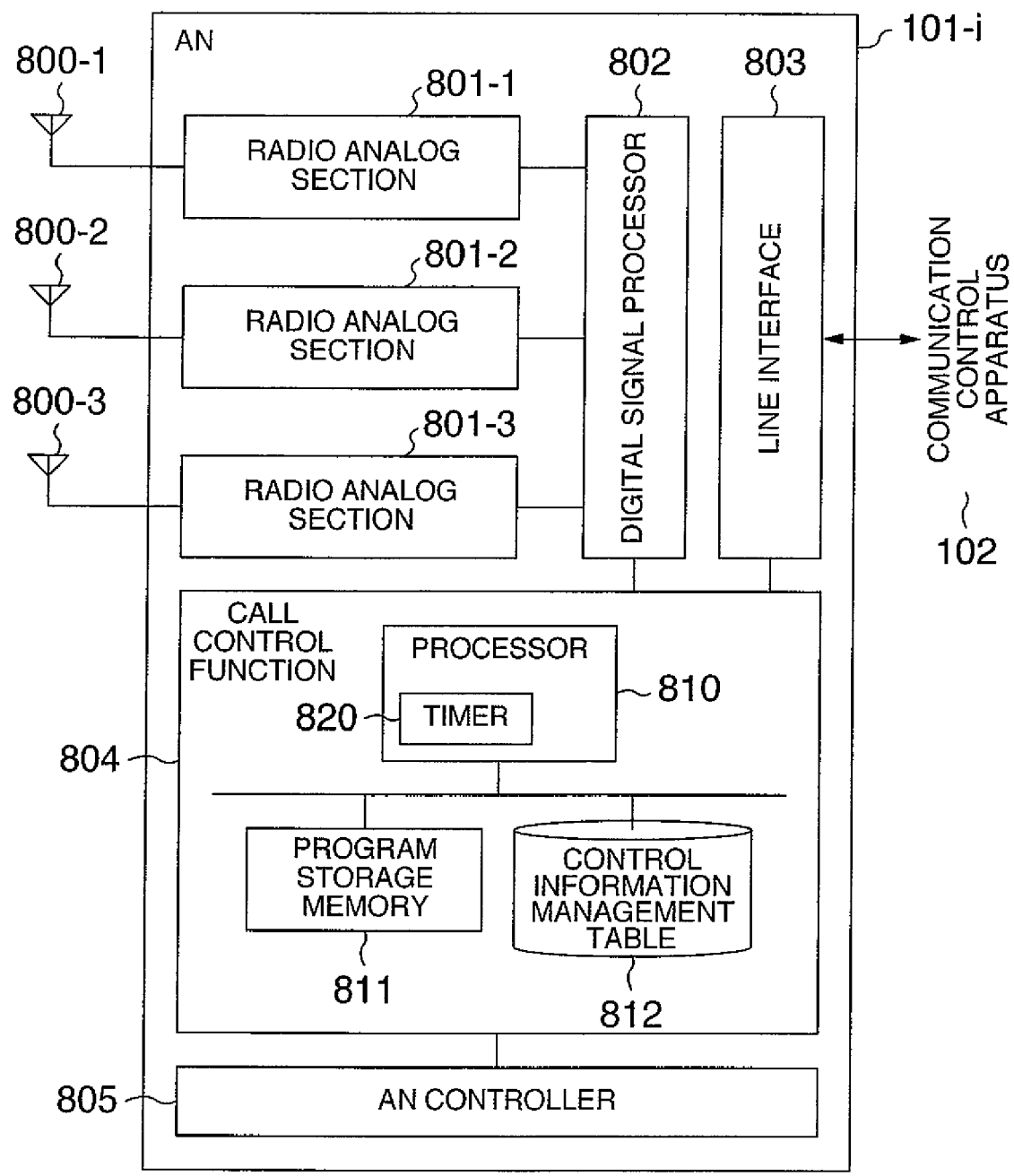
FIG. 8 is a block diagram of a structure of an AN 101-*i*.

FIG. 8 is a block diagram of a structure of the AN 101-$i$. The AN 101-$i$ has a plurality of antennas 800-$i$ (i=1 to 3), radio analog sections 801-$i$ (i=1 to 3) connected to the respective antennas 800-$i$, a digital signal processor 802 connected to the radio analog sections 801-$i$, a line interface 803 connected to the digital signal processor 802, a call control function 804 connected to the digital signal processor 802 and the line interface 803, and an AN controller 805 connected to the call control function 804. The line interface 803 is connected also to the communication control apparatus 102.

In this example, the radio analog section 801-$i$ converts an analog signal received from the AT 100-$i$ via the antenna 800-$i$ into a digital signal, and outputs it to the digital signal processor 802. The radio analog section 801-$i$ converts the digital signal received from the digital signal processor 802 into an analog signal, and transmits the converted analog signal to the AT 100-$i$ via the antenna 800-$i$. The digital signal processor 802 demodulates a signal received from the radio analog sections 801-$i$ or modulates a signal to the AT 100-$i$. The line interface 803 transmits or receives a packet to or from the communication control apparatus 102. The call control function 804 has a processor 810, a memory 811 for storing a program or the like to be executed by the processor 810, and a control information management table 812 for management of control information to be informed to the AT. The processor 810 also has a timer 820. The timer 820 is used to transmit a flow delete request of the BCMCS flow to the communication control apparatus 102, when the processor 810 fails to receive a view & listen request of the BCMCS flow from the AT 100-$i$ for a predetermined time. Stored in the control information management table 812 are information on transmission timing, etc. of a BCMCS flow transmitted from the communication control apparatus 102. The processor 810 transmits this information to the AT 100-$i$ as control information. Though not illustrated, the AT stores the information informed by the AN in a memory provided in its own AT. The transmission period of the control information is synchronized with the transmission cycle of the BCMCS flow (Equation (1)).

$$\text{(one transmission period of control information)} = n \times \text{(transmission cycle of one BCMCS flow), where } n \text{ is a natural number} \quad (1)$$

When the AT not communicating with the AN hands off between ANs, the information informed from the AN before hand-off and stored in the memory is updated to information informed from the AN after the hand-off. When the AT is not communicating with the AN, the AT is shifted to a sleep mode to suppress the consumption of a battery of its own AT. In the sleep mode, the AT is activated about once in 5 seconds. Thus when the transmission period of the control information is not synchronized with the transmission cycle of the BCMCS flow, a delay corresponding to one transmission cycle at the most takes place after reception of the informed information until the client watches and listens to the BCMCS flow. Such a problem with the delay can be avoided by synchronizing the transmission period of the control information with the transmission cycle of the BCMCS flow.

On the basis of information about the transmission timing, etc. of the BCMCS flow, the processor 810 controls the transmission of the BCMCS flow to the AT 100-$i$. The AN controller 805 generally controls the entire AN 101-$i$.

FIG. 9 shows a structure of the control information management table 812 provided in the AN 101-$i$. Stored in the control information management table 812 are a BCMCS flow ID 901 for identification of a BCMCS flow transmitted from the communication control apparatus 102, a physical data rate 902, a transmission slot number 903, a transmission timing 904 (allocated head slot), a transmission cycle 905, these data being associated with each other.

In this example, the physical data rate 902 indicates the transmission rate of a BCMCS flow. The transmission slot number 903, which indicates the length of the BCMCS flow, is prescribed by the number of slots. The transmission timing 904, which indicates the timing of transmitting the BCMCS flow, is prescribed by the position of the head slot from which the BCMCS flow is allocated. The transmission cycle 905, which indicates a cycle (fixed value) at which the divided BCMCS flow blocks are transmitted, is prescribed by the number of slots.

Figure 10:
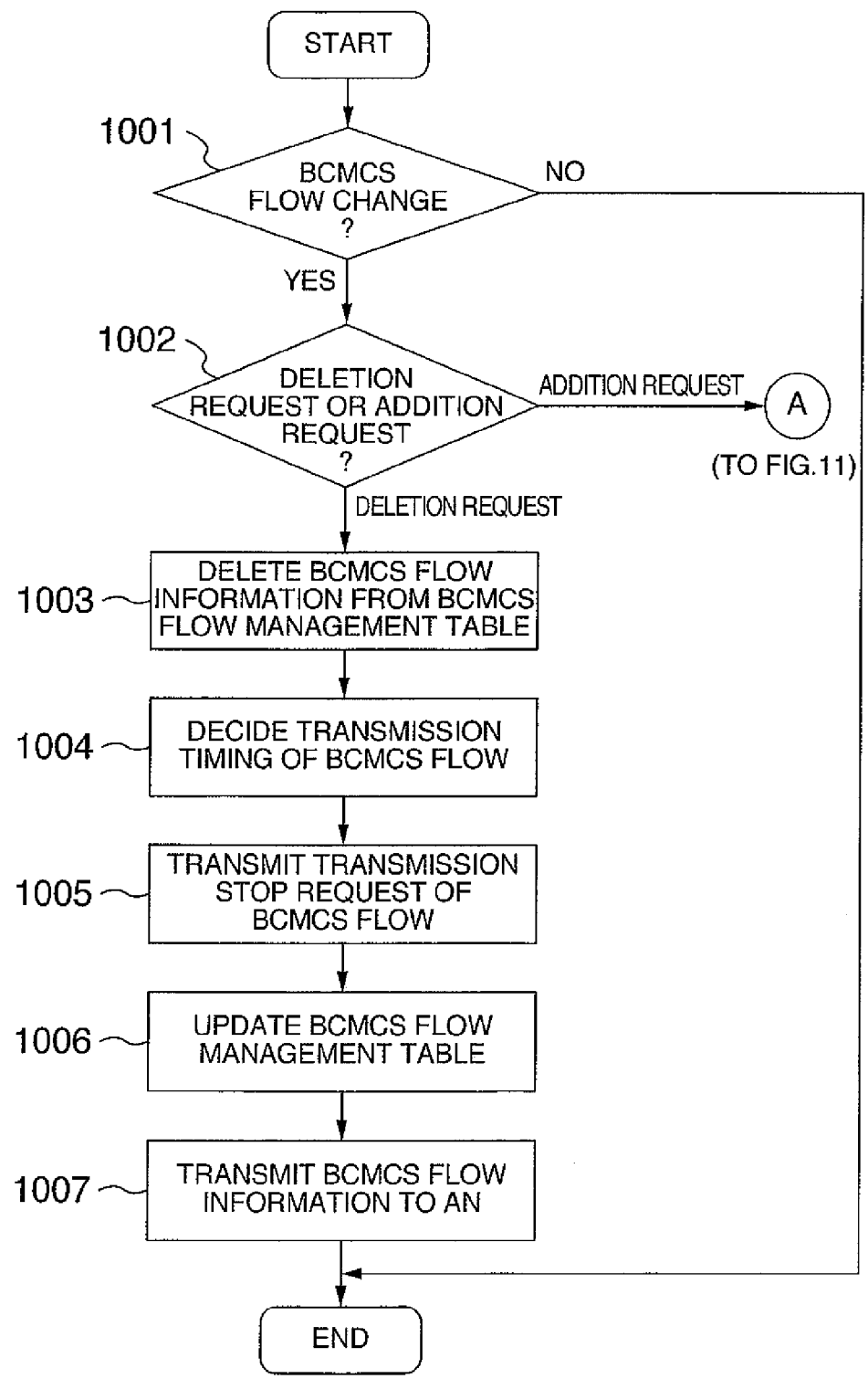
FIG. 10 is a flow chart for finding timing of transmitting a BCMCS flow in the communication control apparatus 102.
Figure 11:
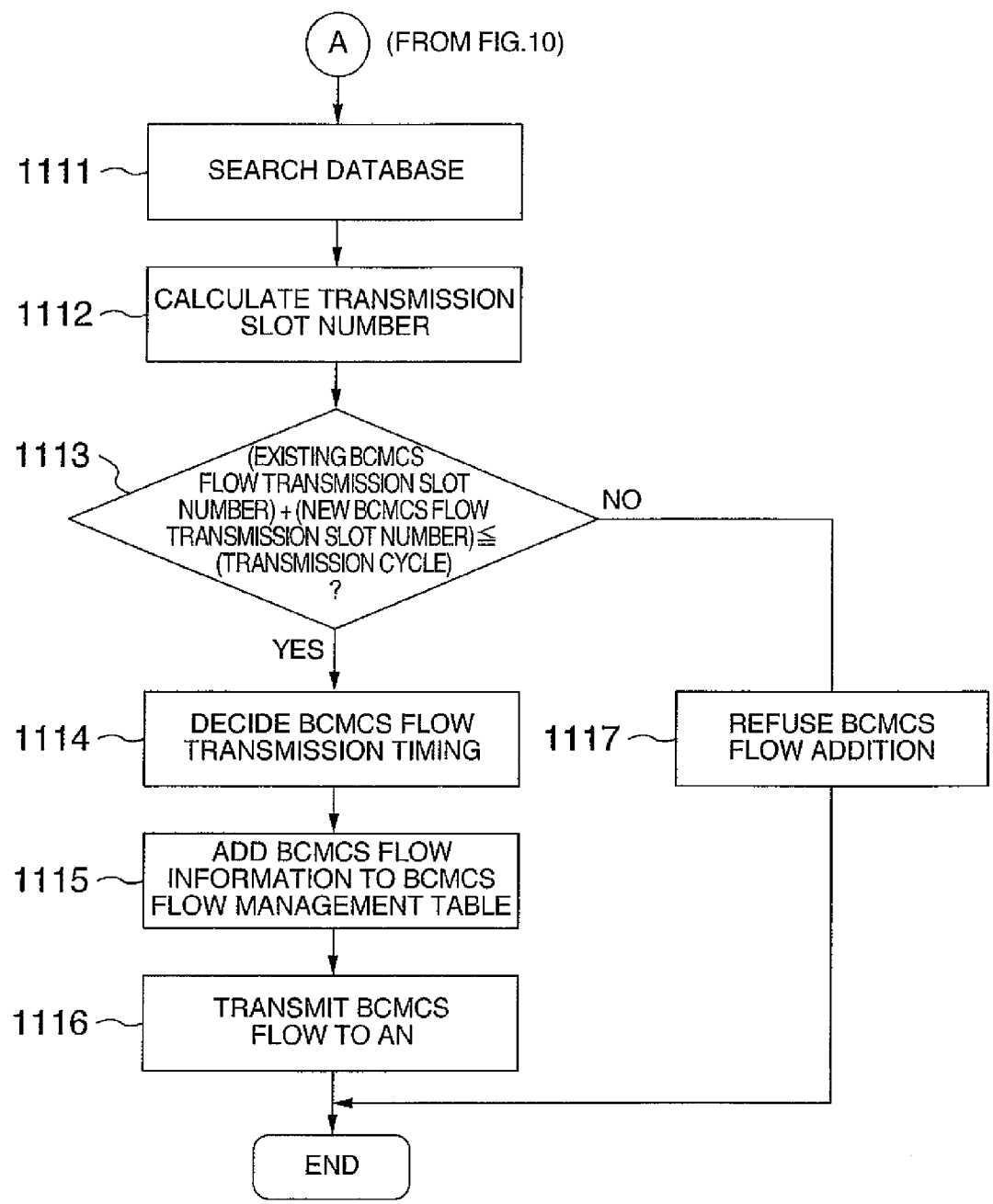
FIG. 11 is a flow chart for finding timing of transmitting a BCMCS flow in the communication control apparatus 102.

FIGS. 10 and 11 show flow charts for finding timing of transmitting a BCMCS flow in the communication control apparatus 102. The value of the transmission cycle previously found is previously set in the BCMCS flow management table 513 of the communication control apparatus 102.

The processor 510 in the communication control apparatus 102 decides the presence or absence of a modification in the BCMCS flow (step 1001). In the presence of a modification in the BCMCS flow, the processor 510 decides whether the modification is a delete request of the BCMCS flow or an addition (new allocation) request of the BCMCS flow (step 1002). In the case of the BCMCS flow deletion request, the processor 510 deletes information about the BCMCS flow in question from the BCMCS flow management table 513 (step 1003). The processor 510 also transmits a transmission stop request of the BCMCS flow to the content distribution server 104 (step 1004). Next, the processor 510 again determines the transmission timing of the BCMCS flow (step 1005). At this time, in order to realize effective use of idle slots, the processor 510 determines the transmission timing of the existing BCMCS flow in such a manner that idle slots are concentratedly located at the last part of the transmission cycle as necessary. In other words, when the other AN is not transmitting a BCMCS flow during a period of the deleted BCMCS flow, the processor puts the BCMCS flow close to the preceding BCMCS flow. When the BCMCS flow is all deleted or when the deleted BCMCS flow is located at the last part of one transmission cycle, no modification of the transmission timing is carried out. Next, when the processor 510 determines the transmission timing of an existing BCMCS flow and there is a modification in the transmission timing; the processor updates the BCMCS flow management table 513 (step 1006); or transmits information (BCMCS flow ID, physical data rate, transmission slot number, transmission timing, and transmission cycle) about the existing BCMCS flow to the AN 101-$i$ (step 1007).

In the step 1002, if there is an addition request of the BCMCS flow, then the processor 510 searches the database 512 on the basis of the BCMCS flow ID included in the addition request (step 1111), and calculates a transmission slot number necessary for transmitting the BCMCS flow in one transmission cycle on the basis of the corresponding physical data rate and application data rate (step 1112). Subsequently, the processor 510 decides according to an equation (2) which follows, whether or not the BCMCS flow in question can be transmitted in one transmission cycle (step 1113).

$$\text{(transmission slot number of existing } BCMCS \text{ flow)} + \text{(transmission slot number of addition } BCMCS \text{ flow)} \leq \text{(transmission cycle)} \quad (2)$$

When a sum of the transmission slot number of the existing BCMCS flow and the transmission slot number of the addition BCMCS flow is not larger than the value of the transmission cycle according to equation (2); the processor 510 determines the timing of the addition BCMCS flow (step 1114); and adds information (BCMCS flow ID, physical data rate, transmission slot number, transmission timing, and transmission cycle) about the BCMCS flow in question in the BCMCS flow management table (step 1115). Requirements necessary for the addition of the BCMCS flow are, as shown by equation (2), that the addition BCMCS flow have a sufficient time to be allocated in one transmission cycle, and that a synchronization be established between the ANs in the allocated time zone of the addition BCMCS flow. The processor 510 transmits information on the BCMCS flow to the AN 101-$i$ (step 1116). In the step 1113, if a sum of the transmission slot number of the existing BCMCS flow and the transmission slot number of the addition BCMCS flow is larger than the value of the transmission cycle, then the processor 510 refuses the addition of the BCMCS flow in question (step 1117).

FIGS. 12 to 15 show a sequence diagram showing the operation of the radio communication system 1 to which the present invention is applied. For the convenience of explanation, a relation, 3(slots)=5(ms)(1(slot)≈1.67(ms)), is assumed to be satisfied. The transmission cycle of the BCMCS flow is set at 48 (slots) and is previously set in the BCMCS flow management table 513 in the communication control apparatus 102. In the present embodiment, with regard to each of BCMCS flows 1, 2, and 3; the physical data rate in the radio space between the AT and the AN and the request throughput of the application of the AT are previously registered in the database 512 within the communication control apparatus 102 (refer to FIG. 6).

The data rate when 1,024 bits are transmitted in a time of 1 slot is 614.4 kbits/s, the data rate when 1,024 bits are transmitted in a time of 2 slots is 307.2 kbits/s, and the transmission rate when 1,024 bits are transmitted in a time of 8 slots is 76.8 kbits/s. For the simplification of explanation, data transmitted from the AN is assumed to be a cluster of raw data that is not having an encode part, an overhead part applied thereto, etc. And in the initial state, it is assumed that any BCMCS flow is not transmitted yet from each AN 101-$i$.

First, the AT 100-$i$, for example, transmits periodically a view & listen request of the BCMCS flow 1 to the AN 101-$i$ (step 1201).

The AN 101-$i$, when receiving the view & listen request of the BCMCS flow 1, transmits an allocation request of the BCMCS flow to the communication control apparatus 102 (step 1202).

The communication control apparatus 102, when receiving the allocation request of the BCMCS flow 1, searches the database 512 on the basis of a BCMCS flow ID (1) included in the request (step 1203), and calculates the minimum number (12 slots) of transmission slots necessary for transmitting the BCMCS flow in one transmission cycle (of 48 slots), on the basis of the corresponding physical data rate (614.4 kbps) and application data rate (150 kbps) (step 1204). Next, the communication control apparatus 102 decides according to the above equation (2) whether or not the BCMCS flow can be transmitted in one transmission cycle (of 48 slots). In this case, since the requirement of equation (2) is satisfied, the apparatus determines to allocate ones of the blocks of the BCMCS flow 1 of one transmission cycle (of 48 slots) corresponding 12 slots from the head slot (step 1205). Subsequently, the communication control apparatus 102 adds information about the BCMCS flow ID (1), transmission slot number (12 slots), transmission timing (0 slots), and transmission cycle (of 48 slots) (step 1206) to the BCMCS flow management table (refer to FIG. 7); and also transmits these information and information about the physical data rate (614.4 kbps) to the AN 101-$i$ (step 1207).

The AN 101-$i$, when receiving these information, adds the information to the control information management table 812 (step 1208). Next, the AN 101-$i$ sets the BCMCS flow management timer 820 (step 1301) (see FIG. 13), and transmits the received information to the AT 100-$i$ at a predetermined period as control information (step 1302). On the basis of the above information, the AN 101-$i$ then draws up a schedule to transmit the BCMCS flow 1 from the content distribution server 104 to a plurality of ATs 100-$i$ in a broadcast manner in synchronism with the transmission cycle of the control information (step 1303). The AN 101-$i$ repeats its transmitting operation in such a manner as to transmit a part of the BCMCS flow 1 corresponding to 12 slots and not to transmit data corresponding to 36 slots (idle).

The AT 100-$i$, on the basis of the received control information, combines and reconstructs BCMCS flows informed from the plurality of ANs 101-$i$.

It is assumed for example that the AT 100-$i$ transmitted a view & listen request of the BCMCS flow 2 to the AN 101-$i$ (step 1304). In this case, as in the steps 1202 to 1208 (see FIG.

12), 1301, and 1302; the BCMCS flow 2 is allocated. As shown in FIG. 7, the minimum number of transmission slots necessary for the BCMCS flow 2 is 10, and the transmission timing (allocated head slot) is slot 12. In this case, since the BCMCS flow 1 is allocated from the head slot (0) within one transmission cycle and transmitted, the BCMCS flow 2 is allocated by an amount corresponding to 10 slots immediately after the allocation of the BCMCS flow 1. A state of a BCMCS flow transmitted from the AN 101-*i* is shown by reference numeral 1350. The AN 101-*i* transmits the BCMCS flow 1 by 12 slots, and transits the BCMCS flow 2 by 10 slots, and does not transmit data corresponding to 26 slots (idle), which operations are repeated.

Even when the AT 100-*i* transmits a view & listen request of the BCMCS flow 3, the BCMCS flow 3 is allocated, as in the steps 1202 to 1208 (see FIG. 12), 1301, and 1302 (see FIG. 13). As shown in FIG. 7, the minimum number of transmission slots necessary for transmitting the BCMCS flow 3 is 8, and the transmission timing (allocated head slot) is slot 22. In this case, since the physical data rate in the radio space is 76.8 kbps and the request data rate is 5 kbps, the transmission slot number becomes 4 at the minimum by calculation. Since the radio space physical data rate of 76.8 kbps is prescribed as a data rate when data of 1,024 bits is transmitted using 8 slots, however, the number of allocated slots is required to be a multiple of 8. Thus, the minimum number of slots is not 4 but 8. Since the BCMCS flows 1 and 2 are allocated from the head slot (0) in one transmission cycle and transmitted, the BCMCS flow 3 is allocated immediately after the allocation of the BCMCS flow 2. A state of a BCMCS flow transmitted from the AN 101-*i* is shown by reference numeral 1450 (see FIG. 14). The AN 101-*i* transmits the BCMCS flow 1 by 12 slots, transmits the BCMCS flow 2 by 10 slots, transmits the BCMCS flow 3 by 8 slots, and does not transmit data corresponding to 16 slots (idle). The AN repeats the aforementioned operations.

Next, when the AN 101-*i* fails to receive the view & listen request of the BCMCS flow 1 from the AT 100-*i* for a time set by the BCMCS flow management timer 320, the AN decides that there is no AT which is listening to the BCMCS flow 1 in an area covered by its own AN (step 1501), and transmits a deletion request of the BCMCS flow 1 to the communication control apparatus 102 (step 1502).

The communication control apparatus 102, when receiving the deletion request of the BCMCS flow 1, confirms that the other ANs are not transmitting the BCMCS flow 1, and then deletes information about BCMCS flow 1 from the BCMCS flow management table 513 (step 1503). The communication control apparatus 102 also transmits a transmission stop request of the BCMCS flow 1 to the content distribution server 104 (step 1504). The communication control apparatus 102 then again determines the transmission timing of the existing BCMCS flows 2 and 3 (step 1505), and updates the BCMCS flow management table 513 (step 1506). Since the BCMCS flow 1 allocated from the head slot becomes now null, the allocated position of the BCMCS flows 2 and 3 in one transmission cycle is forwardly shifted. The communication control apparatus 102 also transmits information (BCMCS flow ID, physical data rate, transmission slot number, transmission timing, and transmission cycle) about the BCMCS flows 2 and 3 to the AN 101-*i* (step 1507).

The AN 101-*i*, when receiving the information on the BCMCS flow 2 and 3, updates the database 512 (step 1508). The AN also the information of the BCMCS flows 2 and 3 to the AT 100-*i* as control information at intervals of a predetermined period (step 1509). Next, the AN 101-*i*, on the basis of the above information, draws up a schedule to transmit the BCMCS flows 2 and 3 from the content distribution server 104 to a plurality of ATs 100-*i* in a broadcast manner in synchronism with the transmission period of the control information (step 1510).

On the basis of the received control information, the AT 100-*i* combines and reconstructs BCMCS flows informed from the plurality of ANs 101-*i*.

As has been explained above, in accordance with the present invention, since communication information to be transmitted to the AT is set to be transmitted thereto at constant intervals of a predetermined cycle, the BCMCS flow transmitted from the AN can be reliably reconstructed at the AT.

In Embodiment 1, parameters of the transmission slot number, transmission timing, and transmission cycle have been prescribed by the number of slots or the slot number (refer to FIGS. 7 and 9). However, such parameters may be prescribed by time.

Although the BCMCS flow monitoring timer has been provided in the AN 101-*i* in embodiment 1, the timer may be provided in the communication control apparatus 102.

In Embodiment 1, further, parameters such as the transmission slot number, transmission timing, etc. of the BCMCS flow have been found by the communication control apparatus 102 in Embodiment 1. However, the database 512 and the BCMCS flow management table 513 may be provided in each AN and each AN may find such parameters.

2. Embodiment 2

The transmission cycle parameters have been set for control in Embodiment 1. However, the problem can also be avoided by fixing all the transmission times of respective BCMCS flows to a least common multiple γ of the transmission times for prescribed standard data rates.

Since the transmission time of the BCMCS flow in one transmission cycle is fixed to the least common multiple value γ of the transmission times for prescribed standard data rates, the BCMCS flow of all the prescribed standard data rates can be allocated to the fixed transmission time. The value γ is set as a parameter in the AN or the communication control apparatus.

The number of BCMCS flows to be transmitted in one transmission cycle is prescribed as a parameter of an allowable maximum BCMCS flow number η and similarly set. Using the above two parameters, the transmission cycle of the BCMCS flow is expressed by "γ×η".

In accordance with the present invention, the transmission cycle can be kept constant even before or after the addition or deletion of a BCMCS flow, the addition or deletion of the BCMCS flow enables the transmission cycle to be changed, whereby the problem that this influences the other BCMCS flows, can be avoided.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. An access network (AN) controlled by a communication control apparatus and communicating with an access terminal (AT), comprising:
   the AN receives control information via a line interface, including information for allocating communication information from the communication control apparatus, and the AN transmits transmission cycle information via a radio transceiver, for transmitting the communication information in a predetermined transmission cycle to the AT and allocates the communication information via a controller, in the predetermined transmission cycle based on the control information received from the communication control apparatus to send the communication information to the AT, wherein, if the AN needs not to transmit any of plural pieces of the communication information to the AT, the AN pads a period allocated for the piece of the communication information not to be transmitted with the communication information which is allocated in a next transmission cycle.

2. An access network (AN) controlled by a communication control apparatus and communicating with a plurality of access terminals (AT), comprising:

the AN receives control information via a line interface, including information for multiplexing communication information from the communication control apparatus, and the AN transmits transmission cycle information via a radio interface, for transmitting the communication information in a predetermined transmission cycle to the ATs and multiplexes the communication information via a controller, in the predetermined transmission cycle based on the control information received from the communication control apparatus to send it to the ATs, wherein, if the AN needs not to transmit any of plural pieces of the communication information to the ATs, the AN pads a period allocated for the piece of the communication information not to be transmitted with the communication information which is allocated in a next transmission cycle.

3. A radio communication method performed by an access network (AN) wirelessly communicating with an access terminal (AT) and a communication control apparatus controlling the AN, comprising:

sending, by the communication control apparatus, transmission cycle information and control information to the AN, the transmission cycle information being for transmitting communication information to the AT in a predetermined transmission cycle and the control information including information for allocating the communication information;

sending, by the AN, the transmission cycle information received from the communication control apparatus to the AT;

allocating, by the AN, the communication information based on the control information received from the communication control apparatus and sends it in the predetermined transmission cycle to the AT; and calculating, by the communication control apparatus, a transmission slot number necessary for transmitting the communication information in the predetermined transmission cycle based on a physical data rate and an application data rate corresponding to the communication information included in a transmission request from the AT to determine a transmission timing indicating a period in the predetermined cycle allocated for the communication information.

4. A radio communication method performed by an access network (AN) wirelessly communicating with an access terminal (AT) and a communication control apparatus controlling the AN, comprising:

sending, by the communication control apparatus, transmission cycle information and control information to the AN, the transmission cycle information being for transmitting communication information to the AT in a predetermined transmission cycle and the control information including information for allocating the communication information;

sending, by the AN, the transmission cycle information received from the communication control apparatus to the AT;

allocating, by the AN, the communication information based on the control information received from the communication control apparatus and sends it in the predetermined transmission cycle to the AT; and if the AN needs not to transmit any of plural pieces of the communication information to the AT, padding, by the AN, a period allocated for the piece of the communication information not to be transmitted with the communication information which is allocated in a next transmission cycle.

5. A radio communication method performed by an access network (AN) for wirelessly communicating with a plurality of access terminals (ATs) and a communication control apparatus controlling the AN, comprising:

sending, by the communication control apparatus, transmission cycle information and control information to the AN, the transmission cycle information being for transmitting communication information to the ATs in a predetermined transmission cycle and the control information including information for multiplexing the communication information;

sending, by the AN, the transmission cycle information received from the communication control apparatus to the ATs;

multiplexing, by the AN, the communication information in the predetermined transmission cycle based on the control information received from the communication control apparatus to send it to the ATs; and calculating, by the communication control apparatus, a transmission slot number necessary for transmitting the communication information in the predetermined transmission cycle based on a physical data rate and an application data rate corresponding to the communication information included in a transmission request from an AT of the ATs to determine a transmission timing indicating a period in the predetermined cycle allocated for the communication information.

6. A radio communication method performed by an access network (AN) for wirelessly communicating with a plurality of access terminals (ATs) and a communication control apparatus controlling the AN, comprising:

sending, by the communication control apparatus, transmission cycle information and control information to the AN, the transmission cycle information being for transmitting communication information to the ATs in a predetermined transmission cycle and the control information including information for multiplexing the communication information;

sending, by the AN, the transmission cycle information received from the communication control apparatus to the ATs;

multiplexing, by the AN, the communication information in the predetermined transmission cycle based on the control information received from the communication control apparatus to send it to the ATs; and if the AN needs not to transmit any of plural pieces of the communication information to the ATs, padding, by the AN, a period allocated for the piece of the communication information not to be transmitted with the communication information which is allocated in a next transmission cycle.

* * * * *